United States Patent
Wei et al.

(10) Patent No.: US 8,321,741 B2
(45) Date of Patent: Nov. 27, 2012

(54) SYSTEM AND APPARATUS FOR PROVIDING AN ADAPTIVE CONTROL MECHANISM FOR WIRELESS COMMUNICATIONS

(75) Inventors: Hung-Yu Wei, Taipei (TW); Ching-Chun Chou, Taipei (TW)

(73) Assignees: Industrial Technology Research Institute, Chutung, Hsinchu (TW); National Taiwan University, Taipei (TW)

( * ) Notice: Subject to any disclaimer, the term of this patent is extended or adjusted under 35 U.S.C. 154(b) by 804 days.

(21) Appl. No.: 12/416,598

(22) Filed: Apr. 1, 2009

(65) Prior Publication Data
US 2009/0276674 A1   Nov. 5, 2009

Related U.S. Application Data

(60) Provisional application No. 61/050,614, filed on May 5, 2008, provisional application No. 61/052,570, filed on May 12, 2008.

(51) Int. Cl.
H03M 13/00   (2006.01)
(52) U.S. Cl. ......................................................... 714/749
(58) Field of Classification Search .......... 714/748–751, 714/752, 758, 774–776, 786, 798–800, 821
See application file for complete search history.

(56) References Cited

U.S. PATENT DOCUMENTS

| 7,600,170 B2* | 10/2009 | Gaal et al. ..................... 714/748 |
| 8,046,028 B2* | 10/2011 | Kim et al. ..................... 455/562.1 |
| 2007/0189282 A1* | 8/2007 | Lohr et al. ..................... 370/370 |
| 2007/0288824 A1* | 12/2007 | Yeo et al. ..................... 714/749 |
| 2008/0065943 A1* | 3/2008 | Botha ........................... 714/748 |
| 2009/0219850 A1 | 9/2009 | Lin et al. |
| 2010/0097949 A1* | 4/2010 | Ko et al. ..................... 370/252 |

FOREIGN PATENT DOCUMENTS

| EP | 1 718 097 A | 11/2006 |
| WO | WO 2006/085732 A | 8/2006 |
| WO | WO 2008/040238 A | 4/2008 |
| WO | WO 2009/078666 A | 6/2009 |

OTHER PUBLICATIONS

European Search Report for EP Application No. 09159285.7.
Office Action issued Feb. 24, 2011 in corresponding Chinese Office Action No. 200910139148.2 (English Abstract of Office Action attached).

* cited by examiner

*Primary Examiner* — Nadeem Iqbal
(74) *Attorney, Agent, or Firm* — Alston & Bird LLP

(57) ABSTRACT

A system for providing an adaptive control mechanism may include a mobile station within a multicast broadcast service group and a base station in communication with the mobile station. The base station may be configured to control provision of data to the mobile station, receive feedback with respect to receipt of at least a portion of the data provided, and determine a configuration of the base station for future transmissions based on the feedback received. The mobile station may be configured to determine a status with respect to receipt of data expected to be received from the base station, generate the feedback indicative of the status determined, and provide for communication of the feedback generated to the base station.

27 Claims, 10 Drawing Sheets

SYSTEM AND APPARATUS FOR PROVIDING AN ADAPTIVE CONTROL MECHANISM FOR WIRELESS COMMUNICATIONS

CROSS REFERENCE TO RELATED APPLICATION

This application claims the benefit of U.S. Provisional Application No. 61/050,614 filed May 5, 2008 and U.S. Provisional Application No. 61/052,570 filed May 12, 2008, the contents of both of which are incorporated herein in their entirety.

TECHNOLOGICAL FIELD

Embodiments of the present invention relate generally to wireless communication and, more particularly, to a system and apparatus for providing an adaptive control mechanism for wireless communication. As such, some embodiments may provide a control mechanism for use in connection with wireless communication systems such as, for example, a Multicast and Broadcast Services (MBS) system, which may serve real-time or non-real-time traffic and support quality of service (QoS) management and signaling functions.

BACKGROUND

In a typical MBS system, operation levels are maintained through constant configuration and signaling. MBS provides sending of traffic flows from a base station (BS) to several mobile stations (MSs) within an MBS group. Thus, MBS provides a one-end-to-multiple-end (i.e., one-to-many) communication mechanism. In doing so, MBS systems can save unnecessary transmissions of single data blocks one by one to each subordinate MS if radio signaling is employed. Because of the broadcast nature of radio signaling, MBS systems are very suitable for employment in wireless systems.

Despite the benefits of providing data to a number of MSs in a wireless broadcast or multicast system such as MBS, one can never be assured that data is correctly received at the receiving stations in a wireless system if the wireless system is only a one-way communication system. In other words, if signaling only flows from the BSs to the MSs, the BSs may not be able to determine whether the MSs properly received the data transmitted to them. Accordingly, it may be desirable to develop an adaptive control mechanism for wireless communications that may provide an efficient mechanism by which QoS may be managed to provide better service through two way communication between BSs and MSs.

BRIEF SUMMARY

Examples of the present invention may provide a mechanism for providing adaptive control in a wireless communication system. Moreover, in some embodiments, a protocol for managing feedback provided in the MS to BS direction is provided. In this regard, for example, some embodiments may provide for an efficient HARQ (hybrid automatic repeat request) feedback mechanism by which control and signaling may be provided in a wireless system such as an MBS system. As such, to ensure data is properly communicated to MSs, a feedback mechanism may be employed so that the MSs may communicate back to the BS to let the BS know whether data has been correctly received or should be retransmitted. Furthermore, the MSs may be enabled to provide the BS with more detailed information for enabling improved or efficient retransmission of data that was not received. Thus, MS to BS and BS to MS controlling schemes may be provided to act as a retransmission mechanism (for example: ARQ retransmission, HARQ retransmission, or network coding based retransmission). Embodiments may also provide for reporting of transmission information to both the MS and the BSs to provide enhanced MBS system operation for use, for example, in an 802.16m (i.e., Worldwide Interoperability for Microwave Access (WiMAX)) system. Accordingly, some exemplary embodiments may provide for a retransmission mechanism for providing improved data reliability.

In an exemplary embodiment, an apparatus for providing an adaptive control mechanism for communication feedback is provided. The apparatus may include a processor configured to determine, at a mobile station within a multicast broadcast service group, a status with respect to receipt of data expected to be received from a base station transmitting data to the group, generate feedback indicative of the status determined, and provide for communication of the feedback generated to the base station.

In another exemplary embodiment, an apparatus for providing an adaptive control mechanism for communication feedback is provided. The apparatus may include a processor configured to control provision of data to a mobile station within a multicast broadcast service group, receive feedback with respect to receipt of at least a portion of the data, and determine a configuration of the apparatus for future transmissions based on the feedback received.

In an exemplary embodiment, a system for providing an adaptive control mechanism for communication feedback is provided. The system may include a mobile station within a multicast broadcast service group and a base station in communication with the mobile station. The base station may be configured to control provision of data to the mobile station, receive feedback with respect to receipt of at least a portion of the data provided, and determine a configuration of the base station for future transmissions based on the feedback received. The mobile station may be configured to determine a status with respect to receipt of data expected to be received from the base station, generate the feedback indicative of the status determined, and provide for communication of the feedback generated to the base station.

Additional features and advantages of embodiments of the present invention will be set forth in part in the description which follows, and in part will be obvious from the description, or may be learned by practice of embodiments of the invention. The features and advantages of embodiments of the invention will be realized and attained by the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating embodiments of the invention, there are shown in the drawings embodiments which are examples. It should be understood, however, that the invention is not limited to the precise arrangements and instrumentalities shown.

In the drawings.

DETAILED DESCRIPTION

Reference will now be made in detail to the present embodiments of the invention, examples of which are illustrated in the accompanying drawings. Wherever possible, the same reference numbers will be used throughout the drawings to refer to the same or like parts. As used herein, the terms "data," "content," "information" and similar terms may be used interchangeably to refer to data capable of being transmitted, received and/or stored in accordance with embodiments of the present invention. Moreover, the term "exemplary," as used herein, is not provided to convey any qualitative assessment, but instead merely to convey an illustration of an example. Thus, use of any such terms should not be taken to limit the spirit and scope of embodiments of the present invention.

Figure 1:
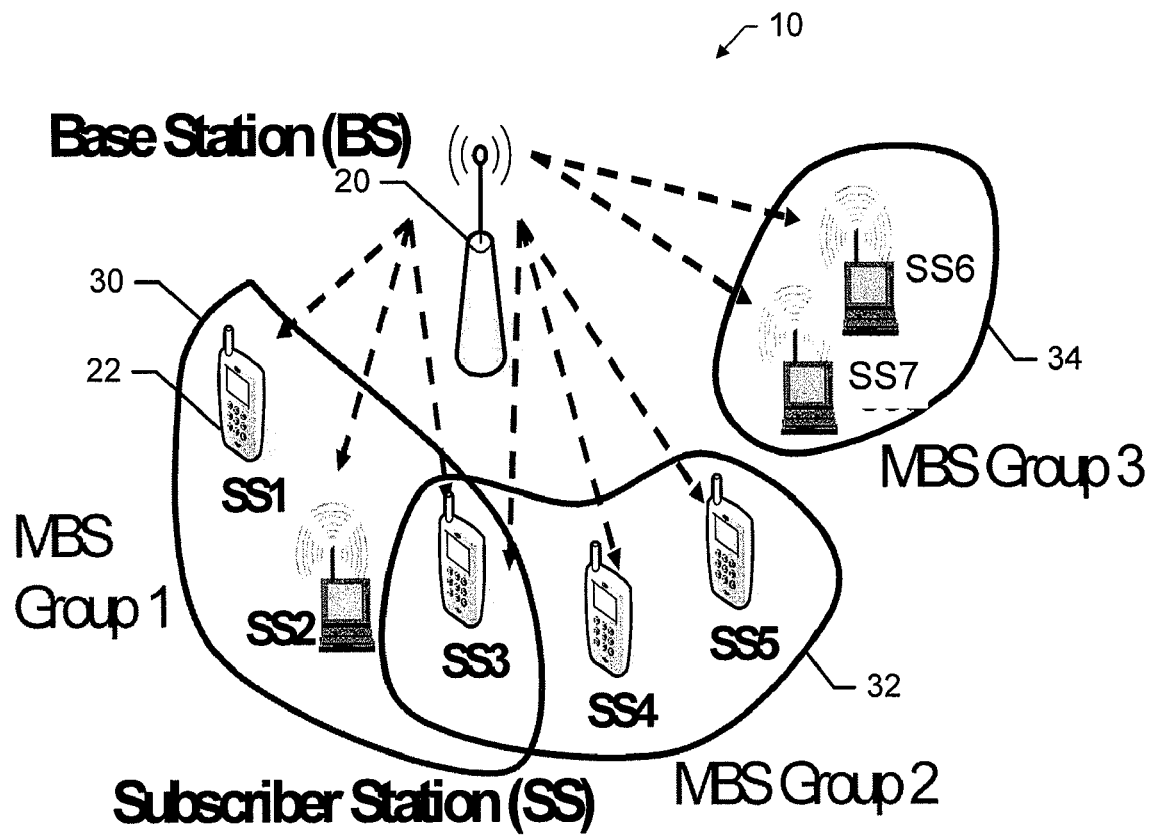
FIG. 1 is a schematic diagram of a system in which an adaptive control mechanism for communication feedback is provided in connection with an example embodiment of the present invention.

FIG. 1 is a schematic diagram of a system 10 capable of providing wireless communication. Of note, the system 10 of FIG. 1 is a MBS system, but embodiments of the present invention may also be practiced in connection with other wireless systems and thus the MBS system shown is merely an example. As shown, the system 10 may include a base station (BS) 20 and a plurality of mobile communication devices (e.g., subscriber station (SS) 22, also labeled SS1). In an exemplary embodiment, each of the SSs may be embodied as a mobile phone, cell phone, digital player, personal digital assistant (PDA), or other mobile communication terminal capable of connection to a network via wireless connections provided by the BS 20. It should be noted that for purposes of the description provided herein, the terms mobile station (MS) and SS should be seen as being interchangeable.

The BS 20 may be a part of one or more cellular or mobile networks each of which includes elements required to operate the network. As such, the BS 20 may include an antenna and supporting hardware for transmitting data to the SSs (e.g., in a broadcast fashion) and also receiving data from the SSs. The network to which the BS 20 is connected may be any of a number of wireless communication networks such as a cellular network and/or a data network such as a local area network (LAN), a metropolitan area network (MAN), and/or a wide area network (WAN), such as the Internet. The network may further include a plurality of processing elements (e.g., personal computers, server computers or the like) that can be coupled to the SSs via wireless connections provided by the BS 20.

In an exemplary embodiment, the wireless connections between the BS and the SSs may include third generation (3G) and/or other communication mechanisms. In the present example, the system 10 is an MBS system in which the wireless connections may be provided by WiMAX based on the IEEE 802.16 specifications. However, other communication mechanisms could alternatively be supported. Since the system 10 in this example is a MBS system, one or more of the SSs may belong to MBS groups. For example, SS1, SS2, and SS3 may be members of a first MBS group 30 (i.e., MBS Group 1) and SS3, SS4 and SS5 may be members of a second MBS group 32 (i.e., MBS Group 2). Thus, as can be seen from FIG. 1, some SSs may be members of more than one group. In this regard, SS3 is a member of both MBS Group 1 and MBS Group 2. In some cases, further MBS groups may be included. For example, SS6 and SS7 are members of a third MBS group 34 (i.e., MBS Group 3). Any number of additional groups may also be included and, as indicated above, there may be overlap between members of the groups.

In an MBS system, the SSs of MBS Group 1 may each receive a first set of data packets from the BS 20. Similarly, SSs of MBS Group 2 may each receive a second set of data packets from the BS 20 and SSs of MBS Group 3 may each receive a third set of data packets from the BS 20. Accordingly, SS1, SS2 and SS3 receive the first set of data packets, SS4 and SS5 receive the second set of data packets and SS6 and SS7 receive the third set of data packets. However, SS3 receives both the first and second sets of data packets. Embodiments of the present invention may provide controlling and/or signaling schemes for managing quality of service for the system 10 in relation to providing a feedback mechanism by which the BS 20 may be informed if any of the SSs require retransmission of data not properly received at a corresponding SS.

In an exemplary embodiment, control messages sent back to the BS 20 from an SS may provide feedback on channel state information, acknowledgement of receipt or a combination of channel state information and acknowledgement among other things. Embodiments of the present invention may provide for exemplary negative acknowledge (NACK) schemes that may be used to provide feedback that may improve communication efficiency in the system 10. In this regard, among other things, a "pure busy tone NACK feedback" and/or a "NACK preamble feedback" may be provided. In an exemplary embodiment, in pure busy tone NACK feedback, the SS may transmit only a tone to indicate a NACK or poor channel state information (CSI). The BS 20 may then trigger retransmission to the SS upon receipt of the NACK, and may adjust the modulation and coding to adjust for the poor CSI. Meanwhile, the NACK preamble feedback may involve the sending of a predefined NACK sequence to the BS 20 indicating a NACK message, in which the predefined NACK sequence precedes the actual NACK sequence.

In some embodiments, for the BS 20 to transmit control signals to an SS or MS, the BS 20 may poll the MBS group of the SS to monitor a downlink (DL) pilot and send CSI information. The polling may be done before the actual transmission and the polling message can be used as a pilot to measure CSI. The multicast may be on-demand or periodic. For on-demand polling, the BS 20 may poll the MBS group any time and the SS may be responsible for monitoring polling messages closely. For periodic polling, the BS 20 may configure the operation before the polling phase, and the SS may follow instructions regarding listening to the polling message and send CSI back. At other times, the SS may go to sleep. The BS 20 may use gathered data to adjust the multicast service and allocate radio resources.

MBS can be applied to various services such as real-time or near real-time traffic like video streaming, non-real-time traffic for better radio efficiency, or signaling and management mechanisms for QoS parameter configuration and network state broadcast. The configuration and signaling support can be divided into two categories including one category covering MS to BS communication and another category covering BS to MS communication.

According to an exemplary embodiment, MS to BS communication may include reports of CSI or transmission errors. Thus, the MS to BS communication covers MBS system feedback mechanisms, which may be classified into CSI feedback, acknowledgement and combinations of CSI feedback and acknowledgements. CSI feedback may include information indicative of the channel quality for the channel via which the MS received a transmission from the BS. The CSI information may be used by the BS to adjust modulation and coding schemes based on the conditions of the channel as indicated by the CSI. Acknowledgements may indicate whether transmission errors were received in connection with received data. Acknowledgements may include NACK, ACK or combinations of ACK and NACK messages in mixed schemes. In schemes including combinations of CSI feedback and acknowledgements, a feedback signal may include contents or functionalities associated with either or both of acknowledgements and CSI feedback. Embodiments of the present invention incorporating the pure busy tone NACK feedback and the NACK preamble feedback schemes may include a combination of acknowledgements and CSI feedback.

Figure 2:
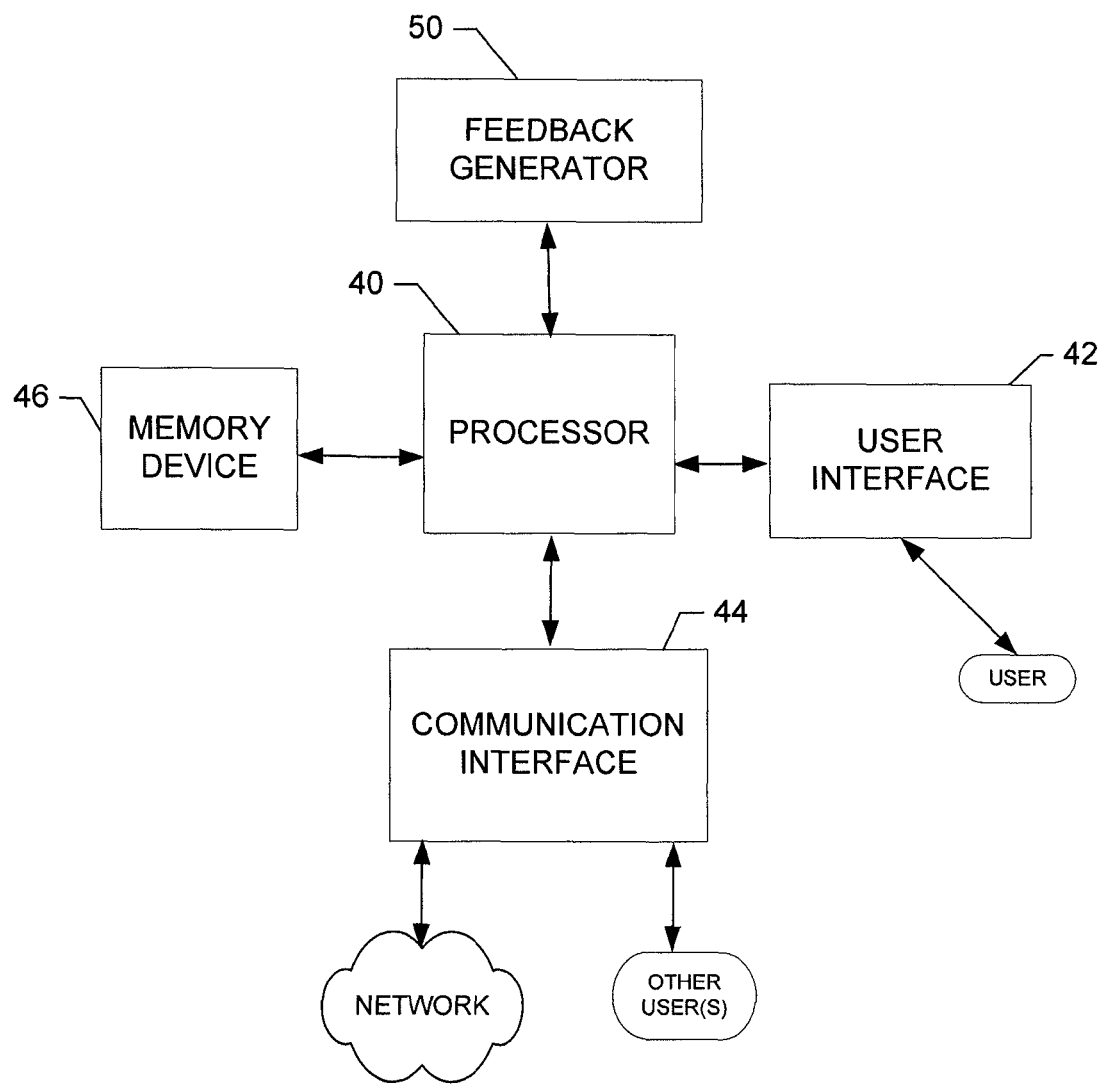
FIG. 2 is an exemplary block diagram of an apparatus for providing an adaptive control mechanism according to one example embodiment of the present invention.

FIG. 2 illustrates a block diagram of an apparatus that may be employed at an MS or SS to provide feedback in accordance with an exemplary embodiment. In this regard, the apparatus may include or otherwise be in communication with a processor 40, a user interface 42, a communication interface 44 and a memory device 46. The memory device 46 may include, for example, volatile and/or non-volatile memory. The memory device 46 may be configured to store information, data, applications, instructions or the like for enabling the apparatus to carry out various functions in accordance with exemplary embodiments of the present invention. For example, the memory device 46 could be configured to buffer input data for processing by the processor 40. Additionally or alternatively, the memory device 46 could be configured to store instructions for execution by the processor 40. As yet another alternative, the memory device 46 may be one of a plurality of databases that store information and/or media content.

The processor 40 may be embodied in a number of different ways. For example, the processor 40 may be embodied as various processing means such as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor 40 may be configured to execute instructions stored in the memory device 46 or otherwise accessible to the processor 40. As such, whether configured by hardware or software methods, or by a combination thereof, the processor 40 may represent an entity (e.g., physically embodied in circuitry) capable of performing operations according to embodiments of the present invention while configured accordingly. Thus, for example, when the processor 40 is embodied as an ASIC, FPGA or the like, the processor 40 may be specifically configured hardware for conducting the operations described herein. Alternatively, as another example, when the processor 40 is embodied as an executor of software instructions, the instructions may specifically configure the processor 40, which may in some cases otherwise be a general purpose processing element or other functionally configurable circuitry if not for the specific configuration provided by the instructions, to perform the algorithms and/or operations described herein. However, in some cases, the processor 40 may be a processor of a specific device (e.g., an MS or SS) adapted for employing embodiments of the present invention by further configuration of the processor 40 by instructions for performing the algorithms and/or operations described herein.

Meanwhile, the communication interface 44 may be any means such as a device or circuitry embodied in either hardware, software, or a combination of hardware and software that is configured to receive and/or transmit data from/to a network and/or any other device or module in communication with the apparatus. In this regard, the communication interface 44 may include, for example, an antenna (or multiple antennas) and supporting hardware and/or software for enabling communications with a wireless communication network (e.g., via communication with the BS 20).

The user interface 42 may be in communication with the processor 40 to receive an indication of a user input at the user interface 42 and/or to provide an audible, visual, mechanical or other output to the user. As such, the user interface 42 may include, for example, a keyboard, a mouse, a joystick, a display, a touch screen, a microphone, a speaker, or other input/output mechanisms.

In an exemplary embodiment, the processor 40 may be embodied as, include or otherwise control a feedback generator 50. The feedback generator 50 may be any means such as a device or circuitry operating in accordance with software or otherwise embodied in hardware or a combination of hardware and software (e.g., processor 40 operating under software control, the processor 40 embodied as an ASIC or FPGA specifically configured to perform the operations described herein, or a combination thereof) thereby configuring the device or circuitry to perform the corresponding functions of the feedback generator 50 as described below. Thus, in examples in which software is employed, a device or circuitry (e.g., the processor 40 in one example) executing the software forms the structure associated with such means. In some examples, the feedback generator 50 may be embodied as a computer program product including instructions stored on a computer readable medium.

In an exemplary embodiment, the feedback generator 50 may be configured to provide, among other things, for the generation of feedback based on a determination as to whether data has been successfully received. As such, the feedback generator 50 be configured to examine received data and determine, based on the received data, what form of feedback to provide to the BS 20 (if any is appropriate). Further operation of the feedback generator 50 will now be described in reference to FIGS. 1 and 2.

In what may be considered to be a reliable MBS system, the BS 20 may transmit one or more data blocks to wireless SSs of one or more of the MBS groups. As such, the BS 20 sends configuration information to the SSs in a given MBS group to configure operational parameters for reliable MBS transmission. In response to receipt of the data blocks at an SS (e.g., SS4), the feedback generator 50 of the corresponding SS may examine the received data blocks and determine which, if any, form of feedback to provide to the BS 20. In some cases, the feedback provided by the feedback generator 50 may be generated immediately after receiving (or failing to receive) a data block transmission. However, in some alternative embodiments, the feedback may be delayed. In some example embodiments, the feedback generator 50 may provide feedback for one data block reception condition, but in other cases, the feedback generator 50 may provide feedback for indicating the condition of several data blocks using an aggregated report.

The feedback generated by the feedback generator 50 may be a positive acknowledgement of receipt (of a single block or group of blocks) in the form of an ACK message, or may be a negative acknowledgement of receipt (of a single block or group of blocks) in the form of a NACK message. Based on the feedback received from the feedback generator 50 of a particular SS, the BS 20 may retransmit corresponding data blocks. In some cases, the retransmission may apply the same communication mechanism that was used in connection with transmitting the original data block(s) to which the feedback corresponded. However, in other cases, the retransmission may apply a different communication mechanism (e.g., a different channel coding method or HARQ method) than that which was used in connection with transmitting the original data block(s) to which the feedback corresponded. In some instances, one or more data blocks may be re-transmitted in the form of original transmissions or re-transmitted after signal processing or coding. Accordingly, the feedback information received at the BS 20 may be used by the BS 20 to determine the next operations to apply based on the current situation as indicated by the feedback information. For example, the BS 20 may use the feedback information to determine whether to send a retransmission or new data block transmission.

The configuration commands sent by the BS 20 may be the same for all SSs in the same MBS group. As such, the configuration command for a particular MBS group may include ACK policy and configuration information and NACK policy and configuration information. The ACK policy and configuration information may define, for example, the type of ACK and the frequency of ACK feedback. The NACK policy and configuration information may define, for example, the type of NACK and the frequency of NACK feedback. In some cases, the configuration mechanism may use the same channel as the data transmission or a different channel (e.g., a control channel). The configuration information may be provided by sending a configuration message before the data transfer phase, including the configuration information in data packets (e.g., in a data packer header or piggybacked in a data packet), or partial information may be sent before data transfer and partial information may be sent with the data packets.

In operation, the BS 20 may transmit data packets to SSs in a particular MBS group. If an SS of the MBS group does not receive a MBS data packet transmission, the feedback generator 50 of the SS may provide a NACK message (i.e., a negative feedback mechanism) indicating failure to properly receive the data packet. If the SS does receive the MBS data packet transmission, the feedback generator 50 of the SS may provide an ACK message (i.e., a positive feedback mechanism) to the BS 20. As indicated above, ACK and NACK messages may be sent immediately after a corresponding data transmission with which the ACK or NACK is associated or may be sent as a cumulative or aggregated feedback report after transmission of several data packets. Different embodiments may employ only a positive feedback mechanism, only a negative feedback mechanism, or a combination of negative and positive feedback mechanisms. More than one SS that is targeted for reception of a particular data block transmission may send an ACK or NACK for the corresponding data block.

In relation to employment of a negative feedback mechanism (e.g., usage of NACK messages), it should be noted that different options may be available. In this regard, some examples of negative feedback mechanisms may include a parallel NACK scheme, a busy tone NACK scheme and/or a NACK-preamble scheme. As described above, generally speaking, in response to a failure to receive data, the feedback generator of the SS failing to receive the data may send a NACK to the BS 20 according to one of the above listed or some other negative feedback schemes. In response to receipt of the NACK, the BS 20 may retransmit the data that corresponds to the NACK.

In a parallel NACK scheme, each SS may be assigned a unique radio resource block. NACK messages may then be transmitted to the BS 20 in parallel (e.g., using the respective radio resources). The radio resource blocks could be time slots, frequency channels, code division multiple access (CDMA) coded channels, orthogonal frequency division multiplexing (OFDM) or orthogonal frequency division multiple access (OFDMA) channels, other wireless communication channels, or time-frequency allocations depending, for example, on system requirement criteria or traffic characteristics. Since each SS is assigned a unique radio resource block, all SSs that intend to transmit NACK messages may perform their respective negative acknowledgements in the same frame. As such, different SSs, each having a respective radio resource, may transmit their feedback in parallel. The parallel NACK scheme may be beneficial due to its multiple transmission method. Thus, multiple nodes may report packet loss in the same frame, thereby giving the BS 20 more information about channel state and characteristics of the packet loss. Accordingly, the BS 20 may more efficiently manage retransmission in subsequent frames, such as adjusting the coding and/or modulation method of retransmission, which may be beneficial for MBS systems.

Figure 3:
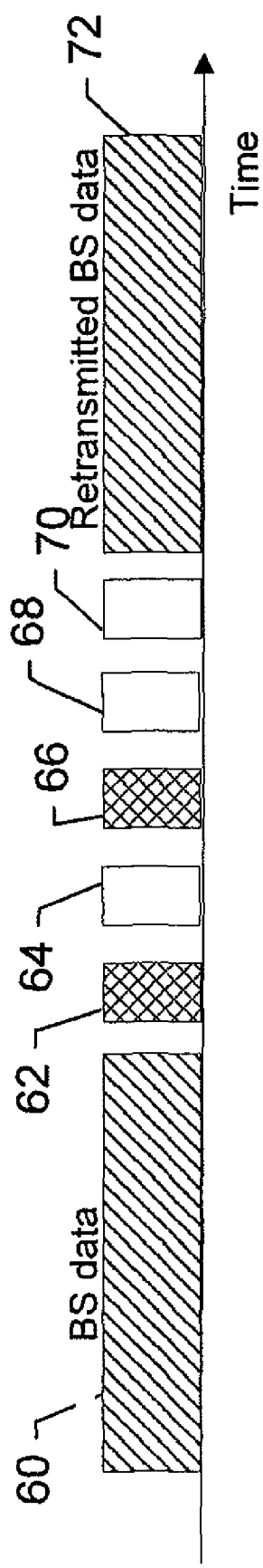
FIG. 3 is an example illustration of a parallel NACK scheme according to an exemplary embodiment of the present invention.

FIG. 3 illustrates an example illustration of a parallel NACK scheme. As shown in FIG. 3, SS1, SS2, SS3, SS4 and SS5 may each be given a separate time slot for providing a NACK report (although any of the other methods described above could alternatively be employed). In the example of FIG. 3, SS1 and SS3 may provide a NACK (in filled slots 62 and 66, respectively) in their respective parallel NACK slots to indicate that SS1 and SS3 failed to properly receive the BS data 60 that was transmitted by the BS 20 at a time prior to transmission of the NACK reports by SS1 and SS3. Meanwhile, radio resource slots for SS2, SS4 and SS5 (e.g., in empty slots 64, 68 and 70, respectively) remain empty since SS2, SS4 and SS5 may be assumed to have properly received the BS data 60. Based on receipt of the NACK reports from SS1 and SS3, the BS 20 may retransmit retransmitted BS data 72 during a following retransmission period.

The busy tone NACK scheme may be implemented by an SS transmitting a busy tone (or a predefined message format) to the BS to indicate that a particular data block was not received. The busy tone may be a predefined sequence or code to be transmitted at a given time, or transmission over a pre-configured wireless channel. For a given MBS group, if the BS 20 receives one or more negative feedback in the form of a busy tone NACK, the BS 20 may retransmit the missing data block. Utilizing the fact the receipt of a busy tone indicates data loss, the BS 20 may be informed that a retransmission is needed and initiate retransmission immediately via a relatively simple NACK scheme. In some cases utilizing CDMA, a different CDMA code may be used for each different SSs busy tone so that the BS 20 may be enabled to distinguish the source of each busy tone.

Figure 4:
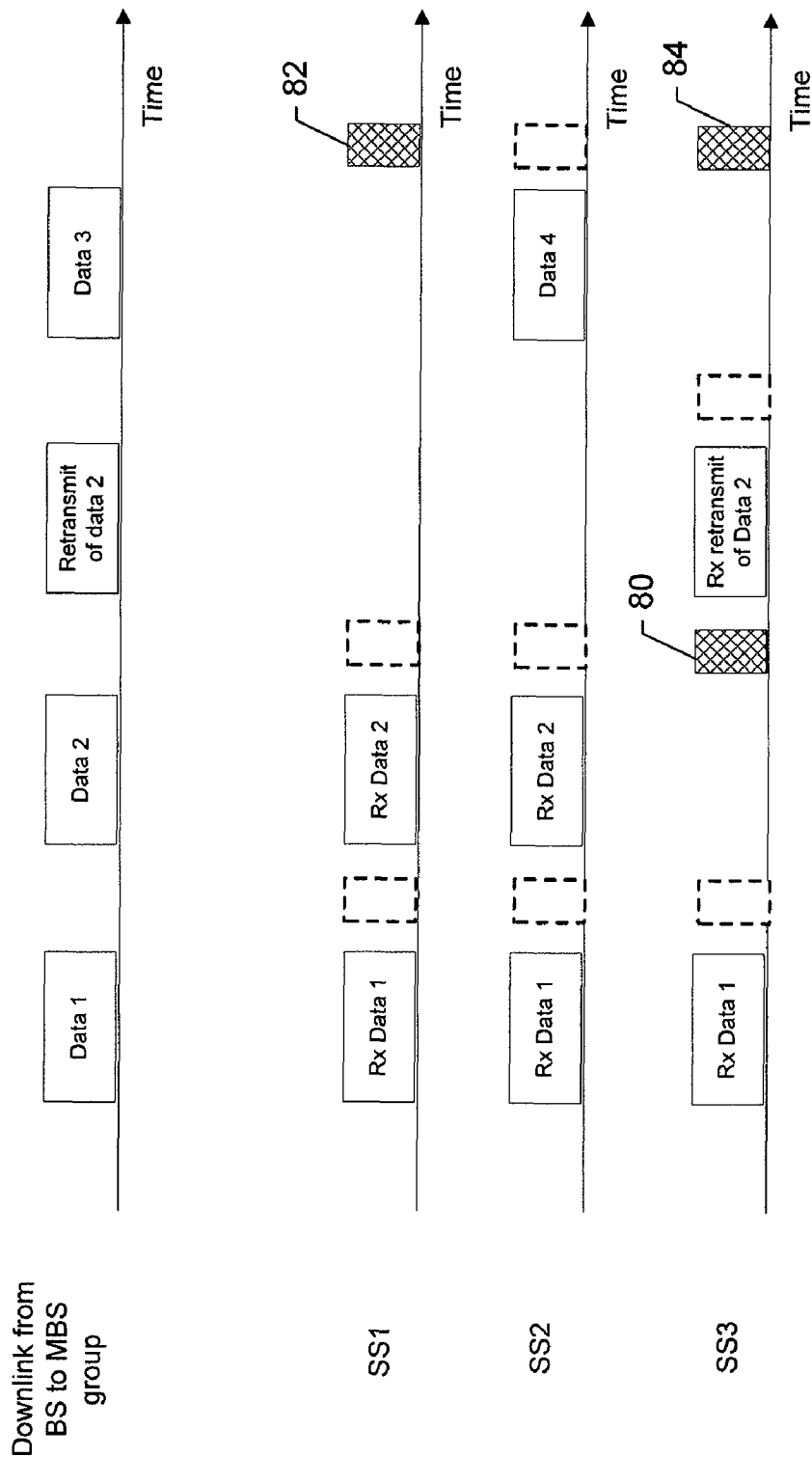
FIG. 4 illustrates an example of signaling activity in which a series of data transmissions are communicated to an MBS group according to an exemplary embodiment of the present invention.

FIG. 4 illustrates an example in which a series of data transmissions are communicated to the first MBS group 30. The data transmissions, including data 1, data 2, a retransmission of data 2 and data 3 are shown on a timeline indicating downlink signaling from the BS 20 to the first MBS group 30. Corresponding timelines for activity from each of the SSs of the first MBS group 30 are also shown in FIG. 4. In this regard, for example, the activity timelines show blocks indicating received data in solid lines and blocks indicating unused busy tone NACK blocks in dashed lines. Busy tones NACKs that are transmitted to the BS 20 are shown filled in with cross hatching. As shown in FIG. 4, SS2 receives data 1, data 2 and data 3 and therefore never communicates any busy tone. However, SS3 receives data 1, but does not receive data 2. Based on the failure to receive data 2, SS3 provides a busy tone NACK 80, which results in the BS 20 providing the retransmission of data 2. The retransmission of data 2 is received by SS3 as indicated in FIG. 4 so the BS 20 then transmits data 3, which is not received by either SS1 or SS3. Thus, both SS1 and SS3 provide busy tone NACKs (busy tone NACK 82 and busy tone NACK 84, respectively) to the BS 20 to indicate the failure to receive data 3.

The NACK-preamble feedback scheme may be utilized to inject a NACK-preamble into NACK design. In this regard, the NACK-preamble may be a pre-defined communication pattern in the form of, for example, a pre-defined sequence, a CDMA code or a time-frequency radio resource block indicating the NACK message, which is transmitted successively. In response to receipt of a NACK-preamble at the BS 20 from one or more of the SSs, the BS 20 may be aware that at least one SS did not receive the corresponding data block. In an exemplary embodiment, the NACK-preamble feedback scheme may employ a NACK-preamble along with a NACK information element. The NACK information element (NACK IE) may be the actual NACK message and may include detailed information regarding the NACK such as a node ID, options, channel state information, HARQ parameters and configuration, and/or other information for assisting in generating a retransmission of the data that was not received.

Figure 5:
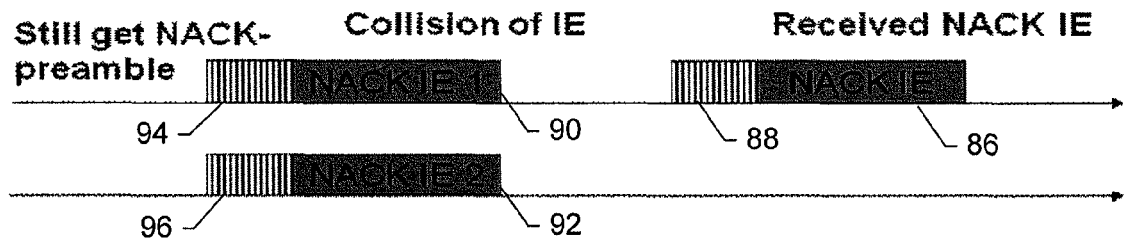
FIG. 5 illustrates an example of a preamble-NACK according to one example embodiment.

The NACK-preamble feedback scheme may provide increased flexibility due to the ability to provide BSs with useful information for configuration of data packet retransmissions. In this regard, if the NACK IE is successfully received at the BS 20, the BS 20 may have information from all SSs reporting data loss and therefore setup the retransmission more efficiently. Furthermore, utilizing the NACK-preamble may provide increased resistance to situations in which there is a failure to receive NACK information (e.g., due to a collision of two NACKs). In this regard, as shown in the example of FIG. 5, a received NACK IE 86 with a NACK-preamble 88 may provide an indication of a failure to receive data for a corresponding data packet, but the NACK IE 86 may also provide details for improved efficiency in generating the retransmission. However, if a collision occurs between two NACK IEs as shown by the collision between NACK IE 90 and NACK IE 92, due to the same format of NACK-preamble 94 (which corresponds to NACK IE 90) and NACK-preamble 96 (which corresponds to NACK IE 92), the NACK-preambles may still be received so that the BS 20 can receive an indication of data loss even if more detailed information about the data loss is not available. Thus, the BS 20 may initiate retransmission even in case of a collision.

In some embodiments, rather than employing negative acknowledgement schemes such as those described above, a positive ACK scheme may be employed. In situations where there is a high data block error probability, positive ACK may be used. Some examples of positive ACK schemes include polling ACK, parallel ACK and periodic ACK. Polling ACK typically provides for the SS transmitting an ACK in response to a polling signal from the BS 20. In other words, the SS transmits the ACK in response to a poll for ACK feedback transmission. The ACK message could include the reception conditions of multiple data packets that are transmitted in a given time duration. For periodic ACK, the BS configures the SS to transmit ACK messages periodically. As such, the SS transmits ACK messages to indicate the reception condition during the period covered by the ACK message. For parallel ACK, each SS is allocated a unique radio resource block that can be used to transmit ACK messages in similar fashion to that described above in relation to parallel NACK. Accordingly, parallel ACK may be integrated for simultaneous use with parallel NACK in which case each allocated radio resource block may be used to transmit either an ACK or a NACK.

Figure 6:
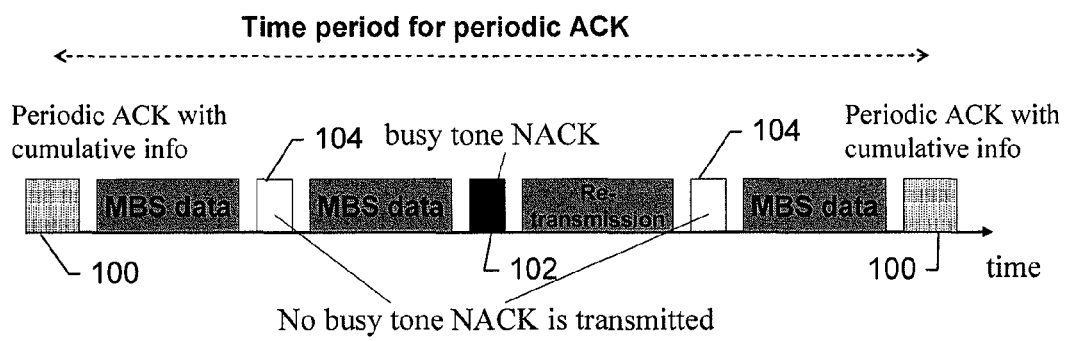
FIG. 6 illustrates a combined periodic ACK and busy tone NACK scheme according to an exemplary embodiment of the present invention.

Combinations of the ACK and/or NACK schemes described above may also be employed. In this regard, for example, FIG. 6 illustrates a combined periodic ACK and busy tone NACK scheme according to an exemplary embodiment. As shown in FIG. 6, a periodic ACK 100 may be sent at a predetermined interval with cumulative information regarding data transmitted during the predetermined interval. Additionally, after each individual data transmission, a busy tone NACK slot may either be utilized to indicate a failure to receive transmitted data (as indicated by NACK 102) or may remain empty when data is successfully received (as indicated by the empty slots 104). When a NACK is received, the BS may send a retransmission.

Figure 7:
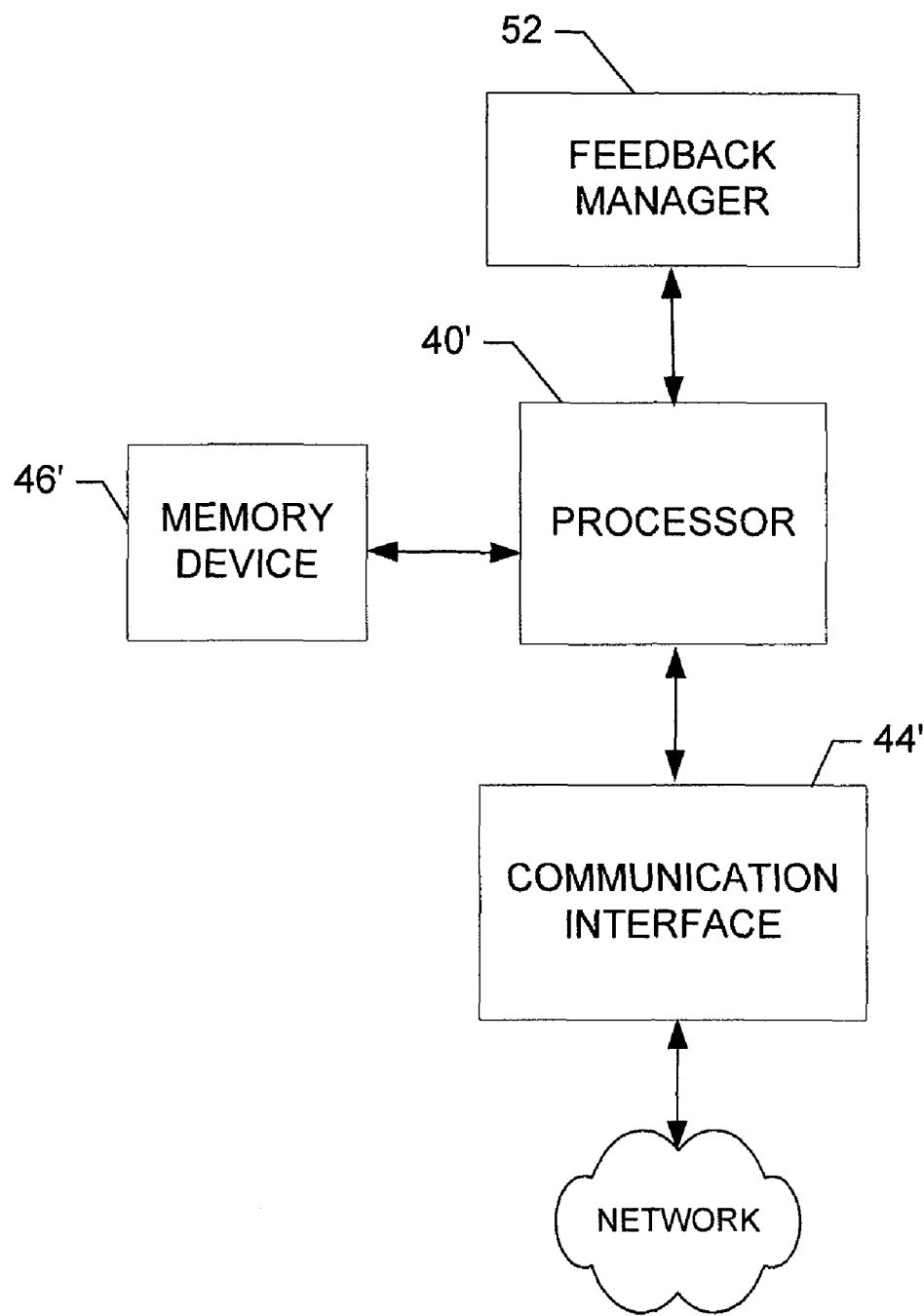
FIG. 7 is a block diagram showing an apparatus for providing an adaptive control mechanism for handling and responding to communication feedback according to an exemplary embodiment of the present invention.

FIG. 7 is a block diagram showing an apparatus for providing an adaptive control mechanism for handling and responding to communication feedback. In this regard, the apparatus of FIG. 7 may be embodied at or in communication with the BS 20 in order to process and/or respond to feedback received from SSs. As shown in FIG. 7, the apparatus may include a processor 40', a communication interface 44' and a memory device 46', each of which may be substantially similar, in terms of structure, to the corresponding processor 40, communication interface 44 and memory device 46 described above in connection with FIG. 2. However, the processor 40' may be embodied as, include or otherwise control a feedback manager 52. The manager 52 may be any means such as a device or circuitry operating in accordance with software or otherwise embodied in hardware or a combination of hardware and software (e.g., processor 40' operating under software control, the processor 40' embodied as an ASIC or FPGA specifically configured to perform the operations described herein, or a combination thereof) thereby configuring the device or circuitry to perform the corresponding functions of the feedback manager 52 as described below. Thus, in examples in which software is employed, a device or circuitry (e.g., the processor 40' in one example) executing the software forms the structure associated with such means. In some examples, the feedback manager 52 may be embodied as a computer program product including instructions stored on a computer readable medium.

The feedback manager 52 may be configured to receive feedback provided from one or more SSs and generate adaptive control signals based on the feedback provided. As such, in some cases, the feedback manager 52 may be configured to retransmit data for which negative feedback was provided and/or change modulation coding schemes or other transmission characteristics in an effort to improve the chances of a retransmission being successfully received.

As indicated above, the provision of channel state information and other information that can be provided via ACK or NACK feedback schemes may enable the BS 20 to provide adjustments to improve future transmissions. In some cases, adaptive modulation and coding scheme (MCS) may be employed. As such, when used in connection with an MBS system, an MBS system with adaptive MCS may be provided. Such a system may initiate (e.g., through control signaling) information collection processes to collect information to determine a transmission mode (e.g., for MCS selection). Such a system may also include a transmission mode selection mechanism to determine the transmission mode and a notification/configuration mechanism for providing notification of the determined transmission mode. Thereafter, a data transmission mechanism may be employed to provide the data transmission. In some embodiments, the transmission mode selection mechanism, the notification/configuration mechanism and the data transmission mechanism may each be embodied as the feedback manager 52 or otherwise be controlled by the feedback manager 52.

Adaptive MBS may utilize CSI information feedback for optimized MCS mode adaptation over various operational phases. Examples of operational phases may include phase (I) in which the BS 20 requests updating status (e.g., CSI) from the SS and phase (II) in which the SS reports the requested status information (e.g., CSI). In phase (III), the BS 20 may determine the transmission configuration and notify the SS via in-band notification (e.g., transmitted in a data frame such as in a data frame header) or out-of-band notification (e.g., explicit control signaling messages). In phase (IV), MBS data may be transmitted with the configuration mode determined. For pure busy tone CSI feedback, the SS may transmit a busy tone (or a predefined format of a message) to the BS 20 to indicate negative feedback (e.g., an indication of poor CSI conditions). Indications of negative feedback may be used by the BS 20 to determine that a more robust modulation and coding scheme should be employed.

Figure 8:
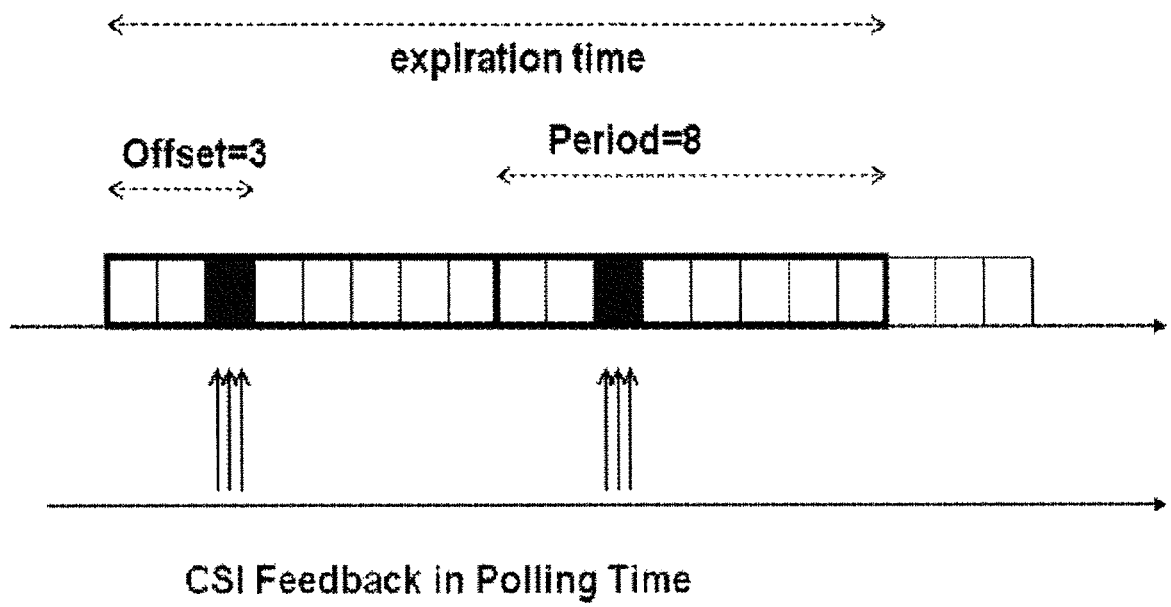
FIG. 8 illustrates a diagram showing periodic polling according to an exemplary embodiment of the present invention.

In an exemplary embodiment, an MBS management polling mechanism may be employed to initiate CSI collection processes. In this regard, for example, the BS 20 may poll SSs in an MBS group to monitor downlink pilot signals and to solicit CSI information. In some cases, CSI estimation may be conducted using polling messages, in which the polling message could be used as a pilot for CSI estimation or CSI could be estimated using pilot signals transmitted over a pilot channel. Modes of MBS polling management may include on-demand or periodic polling. In on-demand polling, the BS 20 may poll MBS groups at any time. Thus, the SSs must typically closely monitor the polling message. In periodic MBS polling management, the BS 20 may configure periodic polling before the polling phase. The SS may then send CSI feedback periodically and go into a power saving mode in other time slots. FIG. 8 illustrates an example of periodic polling for MBS. Parameters associated with periodic polling may include a time period defining the time during which the polling is to be conducted, a time offset, an expiration time (which may be set to infinity in some cases such that an explicit stop signal is needed), or a special case of periodic polling management, for example, in which the BS 20 may poll in every time slot.

Data transmission may be conducted after MBS management polling. In this regard, some possible MBS data transmission and allocation mechanisms may include definite MBS allocation and dynamic MBS and radio resource management. In definite MBS allocation, polling information may be used to adjust MCS. In dynamic MBS and radio resource management, the BS 20 may poll more than one MBS group and may allocate radio resources to the polled group(s). Radio resource management may be jointly conducted for uni-cast data and MBS data such that, for example, a CSI threshold may be applied for resource allocation.

MBS design including adaptive MBS with adaptive MCS and other reliable MBS designs may be employed for data traffic such as non-real-time transmissions or for multimedia traffic such as video or voice data that may be real-time transmissions. Such designs may also be utilized for broadcasting for network status and management and signaling (e.g., multiple signaling for QoS parameter configuration and/or a control signaling mechanism based on MBS transmission).

In some embodiments, MCS selection may employ CDMA code feedback. In this regard, for a communication system using M (a finite positive integer number) sets of modulation and coding schemes, the signaling feedback could be used with M sets of CDMA codes to report the system state information. The wireless nodes in an MBS group could send the CDMA feedback to report the MCS to which they would like to apply. The MCS scheme to report may be estimated based on the packet reception error, the radio signal strength or SINR. To report the selected MCS scheme X, the SS may use one of the CDMA codes from the CDMA code group X. The reported CDMA code may be selected randomly from the code group X or may be selected based on a pre-configured order from the code group X. In some instances, the wireless nodes may send the feedback simultaneously. Nodes that receive multiple CDMA code reporting may use signal strength estimation to obtain extra information (e.g. number of wireless nodes in each reported group). The BS 20 may determine the MCS to be used for MBS based on the CDMA codes.

In CDMA coded transmission for simultaneous feedback, the busy tone NACK and NACK-preamble might apply CDMA codes. As such, for example, CDMA codes could be used to transmit the busy tone signal. Some implementation scenarios may include SSs in a particular MBS group using one CDMA code to indicate busy tone NACK while SSs in another MBS group use another CDMA code, all SSs in a cell using one CDMA code to indicate the busy tone NACK, or each SS in a particular MBS group using a different CDMA code to indicate the busy tone NACK. In some cases, different CDMA codes might imply different NACK meanings such as a received SINR, an interference condition, or an error condition. In some cases, the signal strength of CDMA codes might be used as an indication of channel conditions. A CDMA coded channel could also be used to transmit a busy tone (e.g., NACK busy tone or Negative Feedback busy tone), NACK-preamble (e.g., NACK preamble or Negative Feedback preamble), or both NACK-preamble and NACK IE (e.g., Negative Feedback preamble and Negative Feedback IE). In some embodiments, different CDMA codes might be used to indicate NACK and ACK, respectively. Moreover, the received signal strength might be used as an indication of a receiving (or not-receiving) condition. A reply to the MBS polling management could be implemented in the time domain (e.g., via non-overlapping time slots/time frames), non-overlapping wireless channels, or CDMA coded transmissions. Transmission of CSI feedback using a coded CDMA channel may be combined with selection of CDMA codes to represent more feedback information and conditions.

When the BS 20 receives the NACK busy tone, the BS 20 may be configured to re-transmit the data packet to which the NACK busy tone corresponds with the same transmission mode (e.g. modulation and coding scheme), re-transmit the data packet with a different transmission mode (e.g. a more robust modulation and coding scheme), transmit a data block that is correlated with the previously sent data block (e.g. using HARQ), and/or apply signal processing techniques for the re-transmitted data block (e.g., HARQ (e.g., chase combining, incremental redundancy) or a network coding technique). Similar to the operations after receiving a NACK busy tone, when BS 20 receives busy tone negative feedback, the BS 20 may optimize its MCS based on the history or the busy tone feedback and other information (e.g. ACK feedback, ranging result, interference condition, previous reception history).

When the BS 20 receives negative preamble feedback in the form of a correctly received NACK-preamble and NACK IE, the BS 20 may adapt the transmission scheme based on the information provided by the NACK IE, retransmit the data block, or optimize future transmission and re-transmission settings based on the NACK information provided and/or previous transmission history. When the BS 20 receives negative preamble feedback in the form of a correctly received NACK-preamble, but cannot decode the NACK IE, the BS 20 may adapt and retransmit similar to the scenario of receiving the NACK busy tone, use "blind" optimization techniques to estimate the optimal adjustment of transmission/re-transmission policy, or use the corrupted NACK IE reception condition (e.g., degree of error, received signal strength, CDMA code information, etc.) to adjust transmission or retransmission schemes. The BS 20 may also optimize its MCS in similar fashion to that described above when a negative feedback preamble other than the NACK-preamble is received with or without corresponding correctly received negative feedback information element.

In another exemplary embodiment, joint signaling for reliable MBS and MCS adaptation may be provided. In this regard, each MBS group may have multiple MSs and signaling feedback may apply different CDMA codes (or other different distinguishable transmission methods) to indicate wireless communications states that include reception of data packets and the recommended modulation and coding scheme (MCS) as the wireless communication reception quality is correlated to the wireless channel condition. A joint feedback mechanism may signal a data packet error and indicate an MCS adaption that could effectively reduce the overall signaling cost, especially in the MBS service with adaptive coding and modulation.

In one example, two types of codes may be used for feedback for each MBS group. For example, a first code (e.g., code(I)) may be provided including a NACK that indicates no change to MCS. In this regard, when an MS sends a signaling message to BS 20 with Code (I), this may indicate that the corresponding data block is not received (i.e. Negative Acknowledge, NACK), but that the modulation and coding scheme does not change. As an example, due to wireless transmission error, a data block may not be received. Meanwhile, other transmission conditions (e.g. SNR level, interference condition or the like) may be the same and thus the MS may report to BS 20 with Code (I) to indicate that no change to MCS should be applied for the retransmission.

In another example, a second code (e.g., code(II)) may be provided including a NACK that indicates a change to MCS. In this regard, when an MS sends a signaling message to BS 20 with Code (II), this may indicate that the corresponding data block is not received (NACK) and the MCS also needs to be changed as wireless reception might be poor. As an example, due to poor wireless transmission conditions, a previously transmitted data block may not be correctly received. With a high data transmission error rate, the MCS should be changed to a more robust scheme. The decision to change MCS could be based on the history of data block receiving errors or from other indicators (e.g. SINR measurement).

After the BS 20 receives the feedback code, the BS 20 may adjust the MCS mode and/or retransmit the data block. Retransmission could be conducted with HARQ or ARQ. Adjustment of the MCS scheme may be based on the multiple feedback messages from the members of the multicast/broadcast group. In a general case that applies two or more codes for different signaling messages, the feedback mechanism may apply several codes to report different system statuses. Table 1 below shows four possible scenarios based on the following two criteria: (1) whether data packets are correctly received or not; and (2) the channel state (based on a CSI indicator or other packet error conditions) to determine whether the current MCS scheme could operate smoothly or whether a more robust MCS scheme should be applied.

TABLE 1

Joint ACK/NACK and MCS adjustment feedback

|  | NACK | ACK |
|---|---|---|
| Not Adjust MCS | (A) Use Code (I) | (C) Full reporting [Use Code (III)] |
| More Robust MCS | (B) Use Code (II) | (D) Rare Case [Use Code (IV)] |

In reference to table 1 above according to case (A), the NACK may not adjust MCS. As such, the MS may send a message using Code(I) when one or more data blocks is missing, but the current wireless transmission MCS may be considered acceptable. Under case (B), where the NACK is sent and an adjustment is made to a robust MCS, the MS may send a message using Code (II) when one or more data blocks is missing. Code (II) may indicate that the current MCS scheme results in unacceptable error rate, and a more robust MCS is needed. In case (C), in which an ACK is sent and the MCS is not adjusted, MSs may send a message using a third code, (e.g., Code (III)) to indicate that data packets are correctly received and that the transmission quality under the current MCS is good. Usually, this type of feedback may be implemented with a cumulative full reporting scheme. MSs may occasionally (e.g., periodically or on-demand) send a positive cumulative report that indicates the reception of data blocks in a given period to confirm the MCS to be used. In case (D), in which an ACK is sent with a fourth code to adjust to a robust MCS, MSs may send a message using the fourth code (e.g., Code(IV)) when data packets are correctly received. However, if the wireless channel quality is poor and a more robust MCS is needed, the fourth code may indicate as much. This case may be expected to happen relatively rarely as packet loss and downgrading to a robust MCS is usually contradictory. However, in some cases, which are triggered by other wireless channel quality indicators, this type of feedback could be applied.

In some cases, a combination of the above described schemes may be employed in order to provide different types of MBS feedback. A typical example may be the application of two feedback mechanisms (e.g. Case (A) and Case (B)) for joint MCS adaptation and reliable packet retransmission in MBS.

Different feedback transmission methods may be employed. For example, in relation to code design and transmission, the simultaneous transmission of the codes could still be distinguishable at the receiver so that the BS 20 could understand the feedback message. The codes that are used in the above description may usually be orthogonal or semi-orthogonal in nature. Accordingly, for example, CDMA spreading codes could be used. The transmission method employed may include busy-tone transmission in which the multiple MSs could transmit their respective codes simultaneously. In such an example, the message itself may be the transmitted code. As an example, when the BS 20 receives Code (I), the BS 20 may know that there is one or more MS sending Code (I). Hence, at least one MS did not receive the previously sent data block. The BS 20 could therefore schedule re-transmission accordingly. As another example, when the BS 20 receives Code (II), the BS 20 may know that there is one or more MS sends Code (II). Hence, at least one MS did not receive the previously sent data block and at least one MS suggests changing MCS. The BS may schedule a re-transmission accordingly and adjust MCS accordingly. As yet another example, the BS 20 may receive both Code (I) and Code (II) simultaneously. As such, the BS 20 may schedule re-transmission accordingly and adjust MCS accordingly. In some cases, a negative reporting IE may be provided in which the multiple MSs could send a feedback message simultaneously using the previously described codes. The feedback message may be coded and sent with the previously described codes. The difference between a negative reporting IE and the busy-tone feedback may be that extra information could be coded in connection with the negative reporting IE.

For P-Reliable MBS according to another exemplary embodiment, the reliable MBS could be designed to achieve p-% reliability. Re-transmission of data blocks (e.g. with HARQ) will be conducted so that at least p % of packets will be correctly received. A special case is when p=100%, which may be considered to be fully reliable MBS. Re-transmission cost and communication service quality may be trade-offs in connection with reliability issues. Accordingly, p-Reliable MBS could be designed to operate optimally with limited re-transmission cost. As such, one of the previously described feedback mechanisms may be employed to indicate the loss of data blocks. The BS 20 may then re-transmit or not re-transmit based on the p-reliability criteria.

In another exemplary embodiment feedback estimation may be accomplished with signal strength. For example, the busy-tone or negative reporting IE feedback mechanism may indicate a true/false condition. As such, there may be one or more MS that provides feedback of negative information. The BS 20 may be configured to estimate the number of MSs that send feedback messages by measuring the receiving busy-tone signal strength (or negative reporting message signal strength). This estimation method could be applied along with p-reliability design.

Feedback may also be employed for a single-frequency network. A single-frequency network may support MBS service in multiple cells. With adaptive modulation and coding across multiple cells, there may be a need for a MCS feedback mechanism. In an MBS single-frequency network (SFN), an MS could be categorized as a MS at the boundary of the cell, which may receive signals from multiple base stations, or as a MS at the center of the cell, which may only receive signals from one base station. In the feedback mechanism in SFN, these two types of MS could use two different codes for reporting. Thus, for the MS at the boundary of the cell, one code may be used for feedback and, for the MS at the center of the cell, another code may be used to provide feedback.

Figure 9:
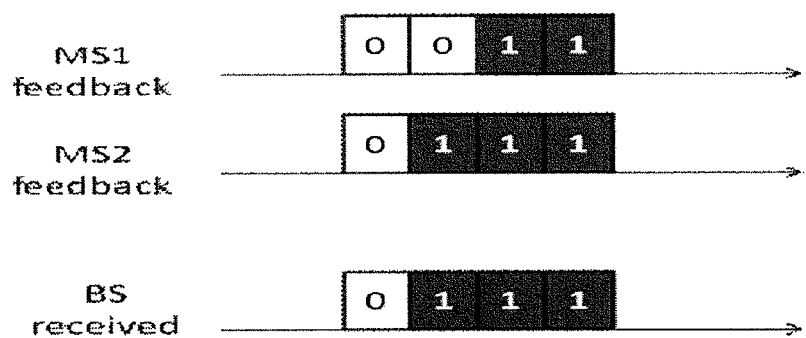
FIG. 9 is a diagram showing an example of simultaneous MBS feedback with a multilevel code sequence according to an exemplary embodiment of the present invention.

In an exemplary embodiment, a multi-level code sequence may be employed for simultaneous feedback reception. As an example, there may be m code sequences that could be used for signaling and the state information may be reported with code sequence Sj, j∈ [1,m]. For any two coding sequences Sj and Sk (j<k), if a bit is set in Sj, then it is also set in Sk. When a lower level code sequence Sj and higher level code sequence Sk (i.e. j<k) are transmitted simultaneously, the receiver may receive the superposition of Sj and Sk. The superposition of the received signal will be Sj. For example, when two wireless nodes report Sj and Sk simultaneously, the receiver will get Sj. In a specific example employing a 4-level code including a first level code (e.g., S1: 0001), a second level code (e.g., S2: 0011), a third level code (e.g., S3: 0111) and a fourth level code (e.g., S4: 1111), when a MS transmits S2 and another MS transmits S3, the BS will receive S3 as shown in FIG. 9.

Timing for sending multilevel coding sequence may be selected based on corresponding factors associated with each situation encountered. For example, the base station may use signaling exchange to configure the time intervals between the periodic or semi-periodic multi-level coding sequence feedback reporting. Alternatively, the base station may use on-demand reporting mechanism or may send the request signaling messages to the subscriber stations. In some cases, the subscriber stations may send feedback reports after receiving the request signaling messages.

In some cases, a multilevel coding sequence could be used for simultaneous feedback that reports system states of multiple communications nodes. In a communications system in which communications nodes share a common channel, the state information may be feedback through the common channel. The state of a communication node may be one of the states in the finite state space. The simultaneous feedback could be applied when only the best (or the worst) state among the multiple communication nodes is needed. Examples of the system state information to be feedback may include wireless communication channel state (e.g. quality of channel state, and/or level of interference), frequency of signaling message feedback (e.g., frequency to report system information such as when the BS asks all MSs to report the CSI state in which case the BS operates with the most frequent signaling requirement), frequency of signaling message announcement (e.g., pilot signal broadcasting frequency or system operation parameter update broadcasting frequency), service quality (e.g., resolution and quality of video streaming in multicast or broadcast service such as when the BS serves with the whole multicast or broadcast group with the resolution/quality that could be decoded by every member), energy state (e.g., different MSs in a cell having different energy efficiency requirements such as location update frequency or paging policy). In some cases, the BS 20 may ask all MSs to report their energy efficiency requirements simultaneous with multilevel codes. The multilevel coding sequence reporting could be applied to uplink reporting and/or downlink reporting. Thus, for example, in association with uplink reporting, multiple mobile stations may report MCS states to BS simultaneously whereas, in association with downlink reporting, for an MS in the boundary of multiple cells, base stations may notify the MCS states that the MS could use for macro-diversity transmission. The multilevel coding sequence reporting could be applied to wireless communications and/or wired-line communications.

Multilevel coding sequence may be used for MCS Adaptation. In this regard, for example, the MS may report the desirable MCS with coding sequence Sj. The lower level code sequence may be used for reporting MCS that is less robust (higher rate) while the higher level code sequence is used for reporting MCS that is more robust (lower rate). As an example, for a wireless network system having MCS of BPSK, QPSK, 16-QAM, and 64-QAM, the first level code S1 may be used for MCS feedback of 64-QAM, the second level code S2 may be used for MCS feedback of 16-QAM, the third level code S3 may be used for MCS feedback of QPSK and the fourth level code S4 may be used for MCS feedback of BPSK. The BS 20 may apply adaptive coding and modulation for MBS based on the received multilevel coding sequence. By using the multi-level code sequence feedback, the BS 20 could know the worst condition MS in the MBS group. Hence, the BS 20 could transmit the most robust MCS for this MBS group based on the feedback information.

Figure 10:
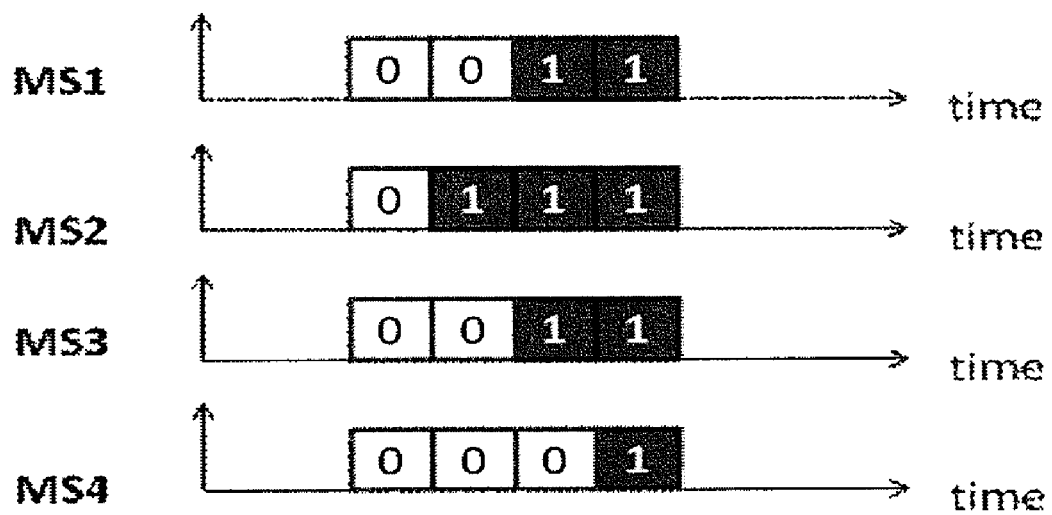
FIG. 10 is a diagram showing an example of feedback determination based on signal strength for simultaneously received MBS feedback according to an exemplary embodiment of the present invention.
Figure 10:
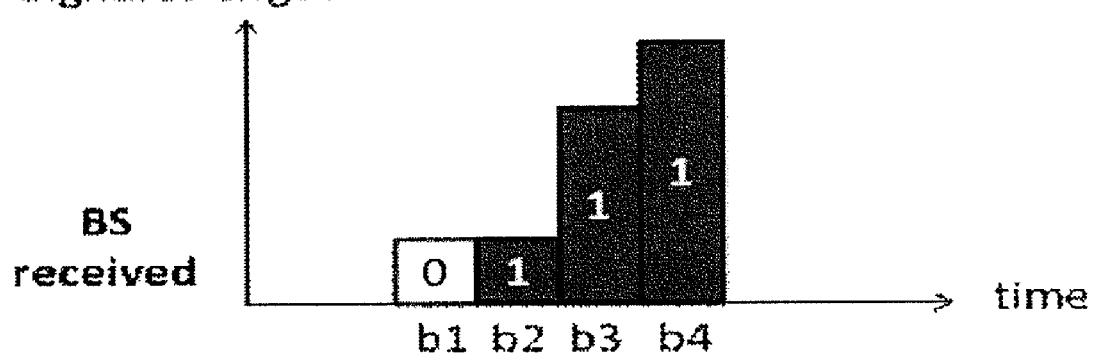

In some cases, transmission of multilevel coding sequence may only be provided in a multilevel sequence reply. Using a multilevel coding sequence for SFN network feedback may support MBS service in multiple cells. With adaptive modulation and coding across multiple cells, there may be a need for a MCS feedback mechanism. In a MBS SFN, there could be different multi-level code sequence for reporting feedback between cells at the middle and edge of a cell. Moreover, in some cases, feedback estimation may be performed based on signal strength. In this regard, in the previously described multi-level code sequence feedback mechanism, the receiver obtains the highest level code sequence among all the simultaneous codes transmitted. The signal strength estimation mechanism could be applied along with the previously described feedback scheme. As such, the BS 20 could estimate the number of MSs that send feedback messages Sj by measuring the receiving signal strength of each of the coding bits. FIG. 10 illustrates an example in which an MBS group including four MSs employs such an exemplary embodiment. In the example of FIG. 10, MS2 reports code S3, and MS1 and MS3 report code S2, while MS4 reports code S1. As the signal strength of the first received bit b1 is 0, it may be determined that there was no code S4 transmitted. By examining the difference between signal strength of bits b2 and b1, the estimation mechanism may determine that there is one MS sending code S3. By examining the difference between signal strength of bits b3 and b2, the estimation mechanism may determine that there are two MSs sending code S2. By examining the difference between signal strength of bits b3 and b4, the estimation mechanism may determine that there is one MS sending code S1. The determinations regarding codes being sent may then be used to determine in what manner to provide a retransmission (e.g., with or without changes in MCS) if a retransmission is desired.

Figure 11:
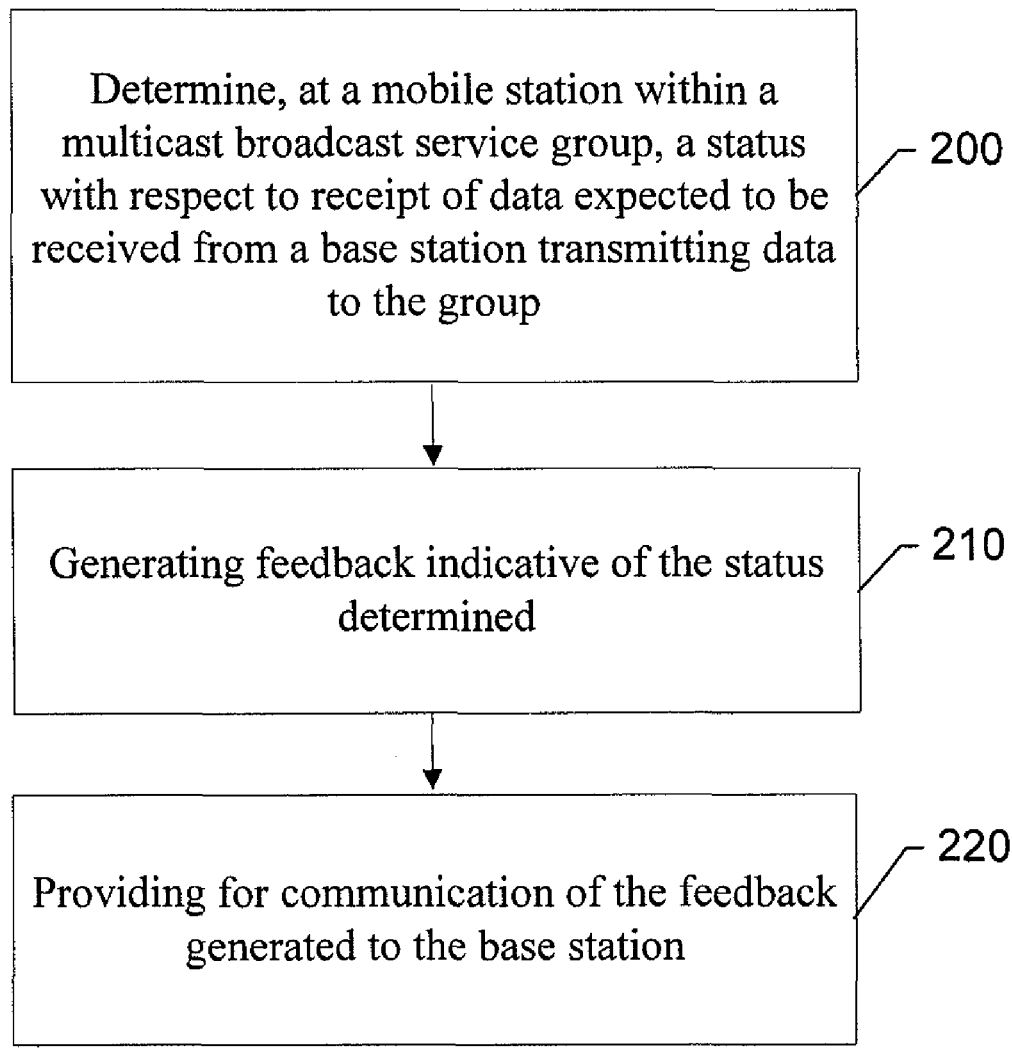
FIG. 11 is a flow diagram illustrating a method of providing an adaptive control mechanism for communication feedback in accordance with an exemplary embodiment of the present invention.
Figure 12:
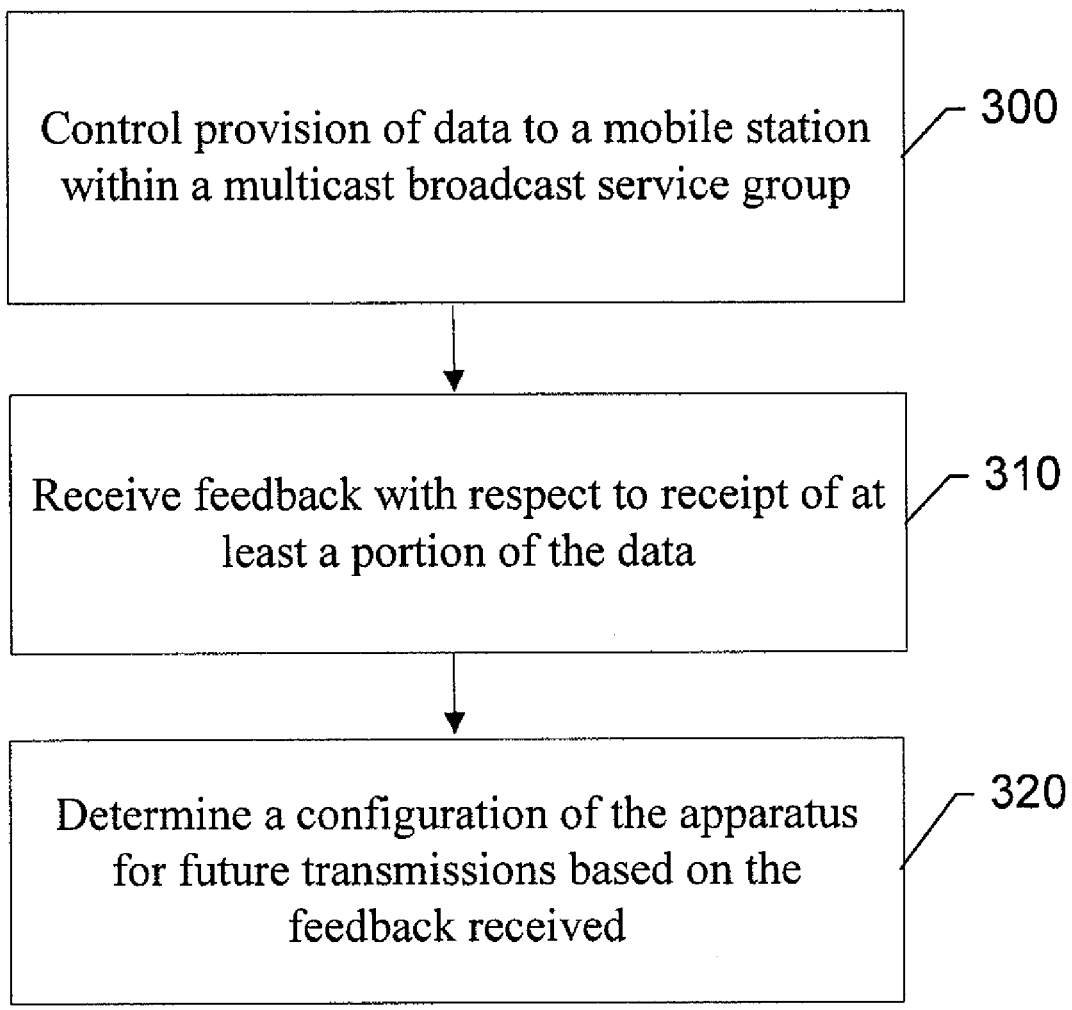
FIG. 12 is a flow diagram illustrating a method of providing an adaptive control mechanism utilizing communication feedback in accordance with an exemplary embodiment of the present invention.

FIGS. 11 and 12 are flowcharts of a system, method and program product according to exemplary embodiments of the invention. It will be understood that each block or step of the flowcharts, and combinations of blocks in the flowcharts, can be implemented by various means, such as hardware, firmware, and/or computer program product including one or more computer program instructions. For example, one or more of the procedures described above may be embodied by computer program instructions. In this regard, in an example embodiment, the computer program instructions which embody the procedures described above are stored by a memory device and executed by a processor or controller. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). In some embodiments, the computer program instructions are stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

One embodiment of a method for providing an adaptive control mechanism from the perspective of a mobile terminal as provided in FIG. 11 may include operation 200 of determining, at a mobile station within a multicast broadcast service group, a status with respect to receipt of data expected to be received from a base station transmitting data to the group. The method may further include generating feedback indicative of the status determined at operation 210 and providing for communication of the feedback generated to the base station at operation 220. The feedback may be used for making determinations regarding retransmission of the data.

In some embodiments, certain ones of the operations above may be modified or further amplified as described below. It should be appreciated that each of the modifications or amplifications below may be included with the operations above either alone or in combination with any others among the features described herein. In this regard, for example, generating the feedback may include generating a negative acknowledgement message indicating failure to receive the data. The negative acknowledgement may include a busy tone including a predefined sequence or code transmitted responsive to failure to receive a portion of expected data to identify the portion or an information element defining detailed information regarding a portion of expected data not received and a predefined sequence of preamble information preceding the information element. The information element may include, for example, a node identification, channel state information, hybrid automatic repeat request parameters, or a retransmission mode. In an exemplary embodiment, generating the feedback may include generating a negative acknowledgement message indicating failure to receive at least a portion of the data and a positive acknowledgement message confirming receipt of at least another portion of the data. In some instances, feedback may be provided from the mobile station to the base station in parallel with feedback provided from other mobile stations. In an exemplary embodiment, generating feedback may include generating feedback in response to polling.

In an exemplary embodiment, an apparatus for performing the method of FIG. 11 above may comprise a processor (e.g., processor 40) configured to perform some or each of the operations (200-220) described above. The processor may, for example, be configured to perform the operations (200-220) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-220 may comprise, for example, the processor 40 and/or the feedback generator 50 for processing information as described above.

FIG. 12 illustrates a block diagram of a method for providing an adaptive control mechanism based on received feedback from the perspective of the base station according to another exemplary embodiment. The method may include controlling provision of data to a mobile station within a multicast broadcast service group at operation 300 and receiving feedback with respect to receipt of at least a portion of the data at operation 310. The method may further include determining a configuration of the apparatus for future transmissions based on the feedback received at operation 320. In some cases the method may include additional optional operations such as initiating polling soliciting feedback from the mobile station or notifying the mobile station of a change in transmission configuration.

In some embodiments, certain ones of the operations above may be modified or further amplified as described below. It should be appreciated that each of the modifications or amplifications below may be included with the operations above either alone or in combination with any others among the features described herein. In this regard, for example, receiving feedback may include receiving a negative acknowledgement message indicating failure of the mobile station to receive the data. The negative acknowledgement may be a busy tone including a predefined sequence or code transmitted responsive to failure to receive a portion of expected data to identify the portion or may include an information element defining detailed information regarding a portion of expected data not received and a predefined sequence of preamble information preceding the information element. The information element may include a node identification, channel state information, hybrid automatic repeat request parameters, or a retransmission mode. In some cases, receiving feedback may include receiving a negative acknowledgement message indicating failure of the mobile station to receive at least a portion of the data and a positive acknowledgement message confirming receipt of at least another portion of the data by the mobile station. Alternatively or additionally, receiving feedback may include receiving feedback from the mobile station in parallel with feedback provided from other mobile stations in the group. In an exemplary embodiment, determining the configuration of the apparatus for future transmissions may include providing a retransmission of data indicated as not being received by the mobile station based on the feedback, changing a transmission scheme (e.g., a modulation scheme, a coding scheme, etc.) used to transmit data to the mobile station based on the feedback, or changing transmission characteristics based on receiving a selected code division multiple access (CDMA) code representing descriptive information and conditions under which the data was not received as the feedback.

In an exemplary embodiment, an apparatus for performing the method of FIG. 12 above may comprise a processor (e.g., processor 40') configured to perform some or each of the operations (300-320) described above. The processor may, for example, be configured to perform the operations (300-320) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 300-320 may comprise, for example, the processor 40' and/or the feedback manager 52 for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Further, in describing representative embodiments of the present invention, the specification may have presented the method and/or process of the present invention as a particular sequence of steps or operations. However, to the extent that the method or process does not rely on the particular order of steps set forth herein, the method or process should not be limited to the particular sequence of steps or operations described. As one of ordinary skill in the art would appreciate, other sequences of steps or operations may be possible. Therefore, the particular order of the steps or operations set forth in the specification should not be construed as limitations on the preliminary claims below and the additional claims to be submitted later. In addition, the claims directed to the method and/or process of the present invention should not be limited to the performance of their steps or operations in the order written, and one skilled in the art can readily appreciate that the sequences may be varied and still remain within the spirit and scope of the present invention.

What is claimed is:

1. An apparatus comprising a processor of a mobile station within a multicast broadcast service group, the processor configured to:

determine a status with respect to receipt of data expected to be received from a base station transmitting data to the group;

generate feedback indicative of the status determined; and provide for communication of the feedback generated to the base station, wherein upon receipt of the feedback by the base station, at least part of the feedback is the same as other mobile stations in the group and includes plain text.

2. The apparatus of claim 1, wherein the processor is further configured to generate the feedback including a negative acknowledgement indicating failure to receive the data, the negative acknowledgement comprising a busy tone signal including a predefined sequence or code transmitted responsive to failure to receive a portion of expected data to identify the portion, wherein the busy tone signal is common to other mobile stations in the group.

3. The apparatus of claim 1, the processor is further configured to generate the feedback including a negative acknowledgement message indicating failure to receive the data, the negative acknowledgement comprising a pre-amble signal including predefined communication pattern in the form of one of a predefined sequence, a CDMA code and a time-frequency radio resource block indicating a negative acknowledgement message transmitted subsequent to the transmission of the signal, wherein the pre-amble signal is common to other mobile stations in the group.

4. The apparatus of claim 3, wherein the negative acknowledgement message includes an information element defining detailed information regarding a portion of expected data not received and a predefined sequence of preamble information preceding the information element, and wherein the information element includes a node identification, channel state information, hybrid automatic repeat request parameters, or a retransmission mode.

5. The apparatus of claim 1, wherein the processor is further configured to generate the feedback including a negative acknowledgement indicating failure to receive at least a portion of the data and a positive acknowledgement confirming receipt of at least another portion of the data.

6. The apparatus of claim 1, wherein the processor is assigned a radio resource block to transmit the feedback, wherein the radio resource block is different than that assigned to at least another mobile station in the group to allow the feedback and feedback generated by the at least another mobile station to be transmitted in parallel.

7. The apparatus of claim 1, wherein the processor is further configured to generate the feedback in response to a polling signal initiated by the base station.

8. The apparatus of claim 1, wherein the processor is further configured to provide the feedback via a code division multiple access (CDMA) coded channel and wherein the code division multiple access coded channel is different than that for transmitting feedback generated by at least another mobile station in the group.

9. An apparatus comprising a processor configured to:
control provision of data to a mobile station within a multicast broadcast service group;
receive feedback with respect to receipt of at least a portion of the data, wherein upon receipt of the feedback by the base station, at least part of the feedback is the same as other mobile stations in the group and includes plain text; and
determine a configuration of the apparatus for future transmissions based on the feedback received.

10. The apparatus of claim 9, wherein the processor is further configured to receive the feedback including a negative acknowledgement indicating failure of the mobile station to receive the data, the negative acknowledgement comprising a busy tone signal including a predefined sequence or code transmitted responsive to failure to receive a portion of expected data to identify the portion.

11. The apparatus of claim 9, wherein the processor is further configured to receive the feedback including a negative acknowledgement indicating failure of the mobile station to receive the data, the negative acknowledgement comprising a pre-amble signal including predefined communication pattern in the form of one of a predefined sequence, a CDMA code and a time-frequency radio resource block indicating a negative acknowledgement message transmitted subsequent to the transmission of the signal, wherein the pre-amble signal is common to other mobile stations in the group.

12. The apparatus of claim 11, wherein the negative acknowledgement message includes an information element defining detailed information regarding a portion of expected data not received and a predefined sequence of preamble information preceding the information element, and wherein the information element includes a node identification, channel state information, hybrid automatic repeat request parameters, or a retransmission mode.

13. The apparatus of claim 9, wherein the processor is further configured to receive the feedback including a negative acknowledgement indicating failure of the mobile station to receive at least a portion of the data and a positive acknowledgement confirming receipt of at least another portion of the data by the mobile station.

14. The apparatus of claim 9, wherein the processor is further configured to receive the feedback transmitted in a first radio source block from the mobile station and feedback generated by another mobile station transmitted in a second radio source block different than the first radio source block to allow the feedback and feedback provided from other mobile stations in the group to be transmitted in parallel.

15. The apparatus of claim 9, wherein the processor is further configured to initiate a polling signal soliciting feedback from the mobile station.

16. The apparatus of claim 9, wherein the processor is further configured to determine the configuration of the apparatus for future transmissions by providing a retransmission of data indicated as not being received by the mobile station based on the feedback.

17. The apparatus of claim 9, wherein the processor is further configured to determine the configuration of the apparatus for future transmissions by changing a transmission scheme used to transmit data to the mobile station based on the feedback.

18. The apparatus of claim 9, wherein the processor is further configured to determine the configuration of the apparatus for future transmissions by changing transmission characteristics based on receiving feedback comprising a selected code division multiple access (CDMA) code representing descriptive information and conditions under which the data was not received.

19. The apparatus of claim 9, wherein the processor is further configured to notify the mobile station of a change in transmission configuration.

20. A system comprising:
a mobile station within a multicast broadcast service group; and
a base station in communication with the mobile station, the base station being configured to control provision of data to the mobile station, receive feedback with respect to receipt of at least a portion of the data provided, and determine a configuration of the base station for future transmissions based on the feedback received, wherein the mobile station is configured to determine a status with respect to receipt of data expected to be received from the base station, generate the feedback indicative of the status determined, and provide for communication of the feedback generated to the base station, wherein upon receipt of the feedback by the base station, at least part of the feedback is the same as other mobile stations in the group and includes plain text.

21. The system of claim 20, wherein the mobile terminal is further configured to generate the feedback including a negative acknowledgement indicating failure to receive the data, the negative acknowledgement comprising a busy tone signal including a predefined sequence or code transmitted responsive to failure to receive a portion of expected data to identify the portion.

22. The system of claim 20, wherein the mobile terminal is further configured to generate the feedback including a negative acknowledgement indicating failure to receive the data, the negative acknowledgement comprising a pre-amble signal common to other mobile stations in the group and an information element defining detailed information regarding a portion of expected data not received and a predefined sequence of preamble information preceding the information element, wherein the pre-amble signal includes predefined communication pattern in the form of one of a predefined sequence, a CDMA code and a time-frequency radio resource block indicating a negative acknowledgement message transmitted subsequent to the transmission of the signal.

23. The system of claim 20, wherein the base station is further configured to determine the configuration of the base station for future transmissions by changing a transmission scheme used to transmit data to the mobile station based on the feedback.

24. The system of claim 20, wherein the base station is further configured to determine the configuration of the base station for future transmissions by retransmitting data to the mobile station based on the feedback, the retransmitted data being encoded in a different manner than encoding employed for a previous transmission of the data.

25. The system of claim 20, wherein the base station is further configured to determine the configuration of the base station for future transmissions by retransmitting data to the mobile station based on the feedback, the retransmitted data being encoded in a same manner employed for encoding a previous transmission of the data.

26. The system of claim 20, wherein the base station is further configured to receive the feedback from the mobile station in which the received feedback comprises a multilevel code sequence.

27. The system of claim 20, wherein the base station is further configured to receive the feedback simultaneously from multiple mobile stations, and wherein the base station is further configured to determine the configuration of the base station for future transmissions by determining the configuration based on feedback estimation associated with signal strength of the received simultaneous feedback.

* * * * *